Dec. 28, 1943.   J. N. MILLER   2,337,917
WRECKING APPARATUS
Filed Oct. 10, 1941   2 Sheets-Sheet 1

INVENTOR
James N. Miller
BY
ATTORNEY

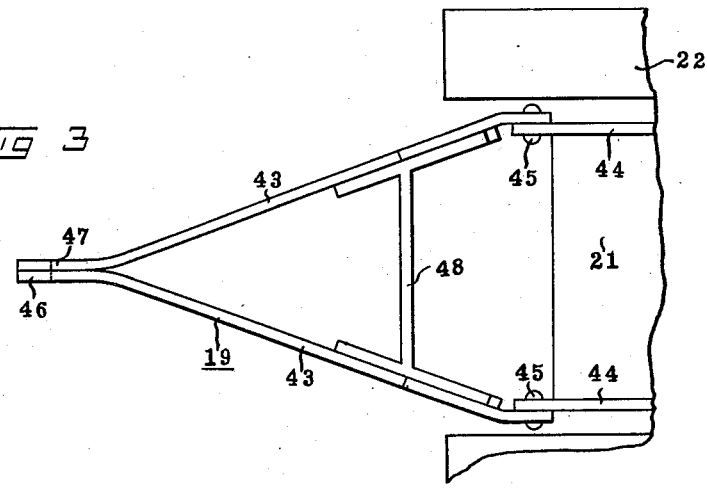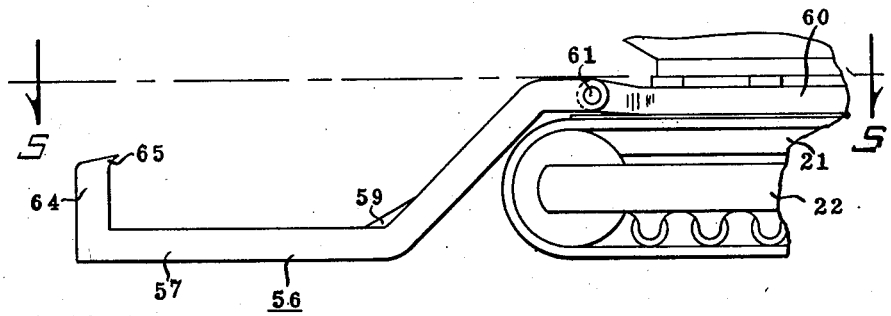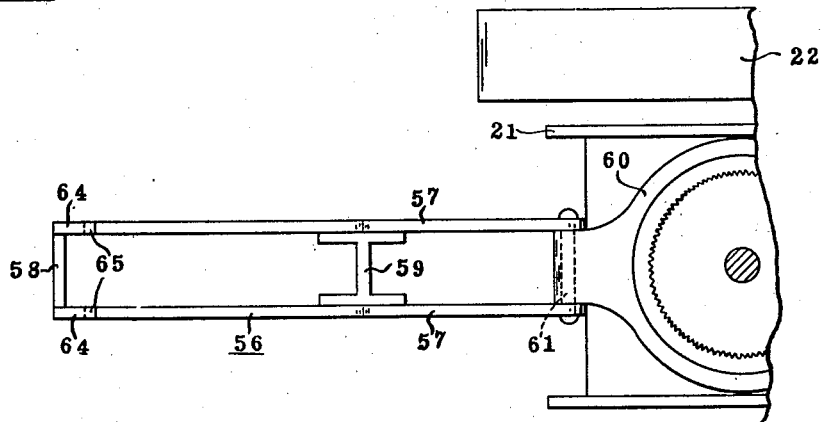

Patented Dec. 28, 1943

2,337,917

UNITED STATES PATENT OFFICE 2,337,917

WRECKING APPARATUS

James N. Miller, Columbus, Ohio

Application October 10, 1941, Serial No. 414,491

3 Claims. (Cl. 29—84)

The present invention relates to a machine for demolishing objects, for example, bodies and chassis of wrecked or scrapped automobiles.

An object of the present invention is to provide a machine for demolishing objects, which machine comprises a mobile frame having power mechanism mounted thereon for moving an arm, which arm can be attached to a portion of the object to be demolished, and a link connected at one end to the frame and swingable about its connected end, the link being attachable to the object to be demolished so that the object can be torn by the arm while the object is held or anchored by the link.

A further object of the invention is to form a hook on the link for engaging the object to be demolished, which hook is set in the object when the object is raised from the ground by the arm.

A still further object of the invention is to arrange the link relative to the arm so that the arm can engage and raise the link from the ground when it is desirable to move the machine.

Further objects and advantages will be apparent from the following description, reference being had to the accompanying drawings wherein preferred forms of embodiments of the present invention are clearly shown.

In the drawings:

Fig. 3 is a fragmentary, plan view of the demolishing machine, showing one form of a hook link;

Fig. 4 is a fragmentary side view of another embodiment of the invention; and

Fig. 5 is a view taken on line 5—5 of Fig. 4.

Figure 1:
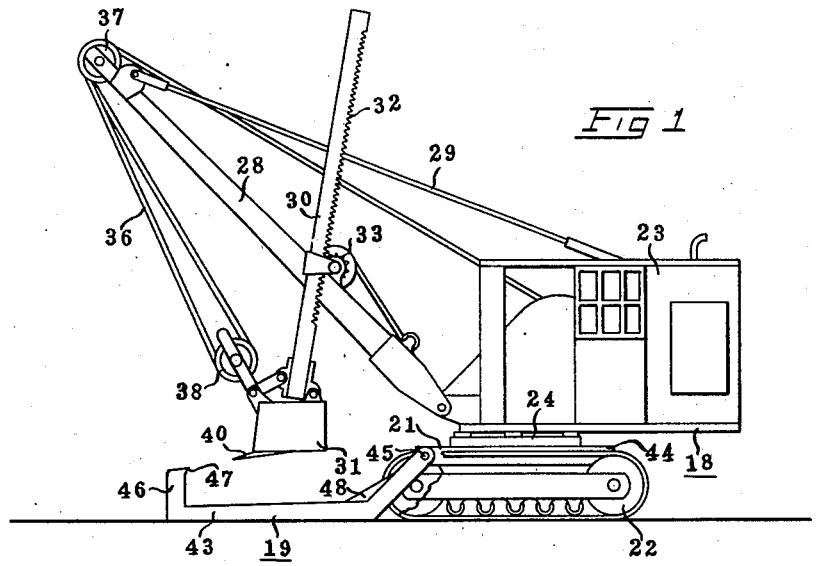
Fig. 1 is a side view of a machine for demolishing scrapped objects, certain parts of the machine being broken away for clearly showing certain other parts.

Referring to the drawings, while my invention may be embodied in a specially designed machine, for simplicity I desire to illustrate the same as applied in connection with a power shovel machine 18, which is well known to the public. A large heavy hook 19 is suitably attached to the machine 18 and functions as a link between the machine and the piece of equipment to be wrecked, as will be clearly described hereinafter.

The machine 18 comprises a frame 21 that is mounted on a caterpillar tractor 22 and a cabin 23 is mounted on the frame 21 by a swivel mechanism 24. The cabin 23 houses an engine, which engine drives the caterpillar tractor, rotates the cabin on the swivel mechanism and provides the power for actuating the shovel mechanism. A boom 28 is attached to the cabin and is supported in an inclined position by suitable cables or guide rods 29. A dipper stick 30 is carried by the boom 28 and a dipper or shovel 31 is attached to the dipper stick. Preferably, beveled prongs 40 are formed along the leading edge of dipper 31 for purposes that will appear hereinafter. The dipper stick is provided with a gear rack 32, the teeth of which rack mesh with a gear 33. The gear 33 is driven by the engine through suitable mechanism under the control of the operator for moving the dipper stick lengthwise for extending the stick from the boom. The dipper stick is rotated about the gear 33 by a cable 36, which cable rides on pulleys 37 and 38 that are mounted on the end of the boom and the dipper, respectively. One end of the cable is attached to the upper end of the boom and the other end is wound on a drum in the cabin, which drum is not shown. The drum on which the cable 36 is wound is arranged to be rotated by the engine through suitable mechanism under the control of the operator.

Figure 2:
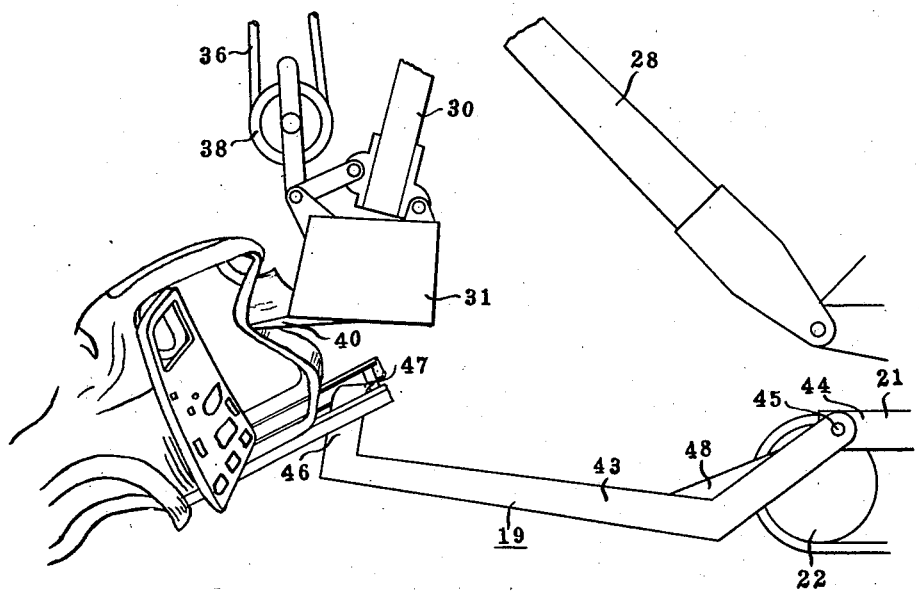
Fig. 2 is a fragmentary view of the machine shown in Fig. 1 but on a larger scale, showing a scrapped automobile being demolished.

The hook link 19 shown in Figs. 1 through 3, is Y shaped and is formed by two beams 43. The ends of the prongs of the link 19 are pivotally attached to two frame members 44 by pins 45. The opposite end of the link is provided with an upturned portion 46 having a rearwardly extending hook or point 47. Preferably, the beams 43 are reenforced by an H shaped brace 48 attached to the inside of the beams. Normally, the free portion of the link 19 rests on the ground.

When it is desired to demolish a scrapped object such as a discarded or "junked" automobile, the dipper stick 30 is manipulated to cause the prongs 40 to catch the automobile at some suitable part and raise it from the ground and place it over the hook portion 46 of the link 19. The dipper 31 is then moved outwardly with respect to the cabin 23, with the prongs 40 catching a portion of the automobile. When this occurs, the hook 47 will engage another portion of the automobile as is illustrated in Fig. 2, whereby the portion of the automobile held by the dipper is torn from the portion held by the hooked link.

After the automobile is torn apart, the dipper can be manipulated to place the various parts into separate piles or to load them on trucks or the like.

By pivoting one end of the link 19 to the frame of the power shovel, the hooked end of the link can rise from the ground when the dipper is tearing the automobile and since the dipper stick 30 is pivoted about a center above the link 19, the link will rotate about its pivot in such a manner as to cause the hook 47 to be more firmly interlocked with the automobile.

Also, by pivotally connecting the link with the frame of the power shovel, the dipper can be manipulated to engage and raise the outer end of the link from the ground so that the power shovel can move from one location to another without interference with the link.

Referring to Figs. 4 and 5 of the drawings, another form of a hook link is indicated at 56. The link 56 is comprised of two parallel beams 57, which beams are braced apart by two brackets 58 and 59. The beams 50 are attached at one end to a collar 60 that is rotatably mounted on the frame 21 of the shovel machine. Preferably, the beams are pivotally attached to the collar 60 and this is done by a pin 61. The opposite ends of the beams are upturned, as at 64 and hooks 65 are formed at the upper ends of the portions 64.

The link 56 operates in a manner similar to the link 19, but the collar 60 permits the link to be turned in the direction of the force applied by the dipper to the object being demolished, so that the stresses applied to the link when objects are torn apart will be lengthwise thereof.

By my invention I have provided a machine that can quickly rend scrapped objects. The machine is particularly suitable for use in scrap yards since it can be moved from one scrap heap to another and it can be operated by a single operator. It will be understood that hammer blow action can be imparted by the dipper 31 to the object being wrecked or demolished and that the hook link and its connections with the frame 21 should be constructed so as to withstand this pounding action.

While the forms of embodiments of the present invention as herein disclosed constitute preferred forms, it is to be understood that other forms might be adopted, all coming within the scope of the claims which follow.

I claim:

1. A demolishing machine comprising in combination, a mobile frame, link means pivotally connected to said frame for movement about a horizontal axis, the free end of said link means being substantially hook-shaped to afford a means for hooking an object that is to be demolished, a boom connected to said frame and extending over said link means, a dipper stick pivotally supported on said boom for swinging movement about a horizontal axis, object engaging means carried by one end of said dipper stick, and power operated means moving said dipper stick to swing said object engaging means in a path substantially at right angles to the hook shaped end of said link means whereby the movement of said engaging means, relative to said link, separates that part of the object so engaged from that part of the object held by said hook.

2. A demolishing machine comprising in combination, a frame, link means having a body portion with upwardly directed ends connected at one end to said frame for pivotal movement in a vertical plane, rearwardly directed hook means provided at the upper free end of said link means, a dipper stick connected to said frame for pivotal movement about a horizontal axis spaced above and forwardly of the pivotal axis for said link means, object engaging means carried by the lower end of said dipper stick, and power operated means for moving said dipper stick to swing said object engaging means in a path which intersects the path travelled by said hook means when said link means is moved about the pivotal axis therefor.

3. An attachment for a power shovel of the type having a base, a swinging boom, and a reciprocating dipper stick that is provided with a shovel at one end, said attachment comprising an elongated frame, means adapted for securing one end of said frame to a base of a power shovel, and engaging means secured to the other end of said frame, said attachment, through the medium of said engaging means, adapted to secure an object to a power shovel while it is being demolished by the actuation of the shovel.

JAMES N. MILLER.